Jan. 13, 1942.　　　G. J. EASTER　　　2,269,445

GLASS TANK WALL AND METHOD OF CONSTRUCTING IT

Filed May 14, 1938

INVENTOR.
GEORGE J. EASTER
BY R C Benner
ATTORNEY.

Patented Jan. 13, 1942

2,269,445

UNITED STATES PATENT OFFICE 2,269,445

GLASS TANK WALL AND METHOD OF CONSTRUCTING IT

George J. Easter, Niagara Falls, N. Y., assignor to The Carborundum Company, Niagara Falls, N. Y., a corporation of Delaware Application May 14, 1938, Serial No. 207,915

7 Claims. (Cl. 49—54)

This invention relates to the construction of glass tank furnaces and particularly to glass tanks in which refractory blocks of high thermal conductivity are used to line the melting and refining chambers. When blocks of high thermal conductivity, such as those cast from fused alumina, are used in lining glass tanks, the heat from the molten glass permeates the blocks with the result that the temperature of the outer portions of the blocks is very close to that of the molten bath.

In the use of bonded refractory blocks for lining glass tanks, it has been found inadvisable to insulate the inner lining due to the subsequent marked increase in the rate of corrosion as the temperature of the lining is increased. For this reason most glass tanks have been operated at an extremely low thermal efficiency due to the heat loss through the walls.

The search for a material which would withstand higher temperatures has resulted in the recent development of refractory blocks made by casting molten refractory oxides such as alumina into the required forms. This type of material has met with some success because of its increased resistance to molten glass and slags at high temperatures, but its high thermal conductivity has presented a serious problem in keeping the molten glass from seeping through the joints between blocks, particularly when the outer faces of the refractories have been insulated. It has been common practice therefore to forego insulation of the back of the blocks in order to keep the joints between them cool enough to congeal the glass before it reached the outer faces. This has resulted in operation under high heat losses and even lower thermal efficiency than with the old type blocks and so to a large part the advantage of increased corrosion resistance has been counteracted.

I have overcome the difficulties and disadvantages described above by the insertion of means between the glass tank blocks to congeal or increase in viscosity any glass that starts to seep through the joints. This higher viscosity retards or prevents its further travel through the joint. This I do chemically by the use of a packing material which will react with the glass to render it more viscous, or mechanically by insertion in the joint of cooling members to render the glass congealed.

One method by which I carry out my invention is as follows: In setting up the blocks, I put the special packing material in the outer portion of each joint between the blocks. The packing material so used should be one especially adapted for the purpose and is of such composition that it will react with the glass being melted so as to render it more viscous by the formation of a reaction product that congeals at a higher temperature.

The composition of the packing or joint material may be varied dependent upon the composition of the glass being melted in the tank, but is always such that when it comes in contact with the molten glass it will react or fuse with the glass to form a new material having a higher melting point or a higher viscosity at a given temperature than the original glass. I have found that for most glasses a highly siliceous material can be used very effectively for this purpose. However, where a tank is used consistently in melting one kind of glass the packing material may be chosen so as to be one which works particularly well with that one glass.

While this packing material may be placed along the entire block joint it usually becomes effective at a point in the joint somewhat removed from the hot face of the tank lining, and I prefer to restrict its application to parts of the joint away from the hot face. This material may be used dry, or may, in certain cases, be moistened enough to cause it to form a stiff paste which is then smeared on the desired portions of the block faces which adjoin to form the joint, thus filling in any irregularities in the face with this packing material to form a smooth surface causing a close fit between the blocks for the entire length of each joint.

The reaction of this material with the glass which penetrates the joint raises the congealing temperature and viscosity of the original glass, causing it to become solidified or so viscous that the joint is substantially sealed and any further penetration of the joint by the glass is prevented. The viscosity is, moreover, so high that there is little tendency of the joint filling compound to work back out into the glass tank.

The reaction product formed by union of the packing material with seepage glass often has a much higher surface tension with respect to the face of the refractories used and does not wet the refractory so readily as the glass being melted. This effect lowers the rate of erosion within the joint of the cast blocks which make up the lining and so constitutes another beneficial result of the use of my special packing material.

In accordance with another modification of my invention, I provide the block faces which form the joints with recesses or indentations which match in adjoining block faces to form enclosures in the outer portions of the joints. These enclosed spaces are then filled with the reactive material referred to above. Thus, an adequate supply of the reactive packing material is provided to unite and form the more viscous glass with any molten glass that penetrates the joint as far as the recesses.

Where the joints are vertical, additional reactive material, to replace that taken up by the glass, can be fed into the joints by means of a funnel and permitted to flow down into the joint. Granular or powdered zirconium silicate is an example of a material which is adapted for use in this manner since it is heavier than the glass and tends to sink down the vertical recesses whenever the glass in them is sufficiently fluid to be dangerous and at the same time is soluble in most glasses to a degree which raises the viscosity.

As stated above, the reactive material provided in joints must be adapted to at least increase the viscosity, if not to cause the glass to congeal. Diatomaceous earth, granular powdered flint, ganister or fused quartz are materials of general utility in this connection because they react with most glasses to form high viscosity products. Zircon and other "acid" oxides are also useful. Some glasses may react with a different type of packing material for efficiently raising their viscosity. For example, borosilicate glasses may be rendered more viscous by contact with a fine alumina, and a limited range of glasses may be made more viscous by contact with powdered lime.

Other means by which the seepage of glass through the wall joints may be reduced or eliminated are metallic or other cooling members positioned in the joints between the blocks so as to conduct the heat away from the molten glass with sufficient rapidity to cool the glass to the point where it becomes extremely thick and viscous, if not solidified. One way of doing this is to have the outer portion of adjoining block faces cut back so as to form a slot in the rear portion of the joint. A thin bar of highly heat-conductive metal and which is broad enough to protrude several inches outwardly from the joint is then inserted in this slot. In this way, the glass as it progresses through the joint comes in contact with this bar of metal and is chilled and solidifies. It then seals the joint and prevents further passage of glass.

Another modification of my invention which is very effective, although costly to install, comprises the use of metal pipes embedded in the outer portion of the joint and fitting closely between the blocks. Blocks having recessed portions that match to form an enclosure in the joint for holding the pipe are useful in this modification. The pipe may have a flange that projects inwardly along the joint in order to cause the glass to congeal before it reaches the outside of the joint. In operation, water is circulated through the pipe and heat is thereby conducted away from the joint. Any glass entering the joint freezes and effects a sealing of the joint. The rate of circulation of the water may be controlled so as to remove no more heat than is essential to keep the joint sealed.

If desired, both the reactive means and the cooling means can be used in setting up the lining of a glass tank.

Figure 1:
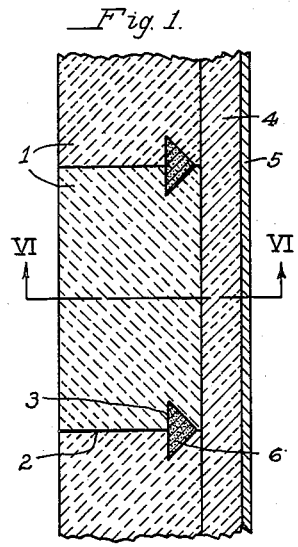
Figure 1 is a fragmentary horizontal sectional view of a glass tank wall using recessed blocks having joints filled with potentially reactive material.
Figure 2:
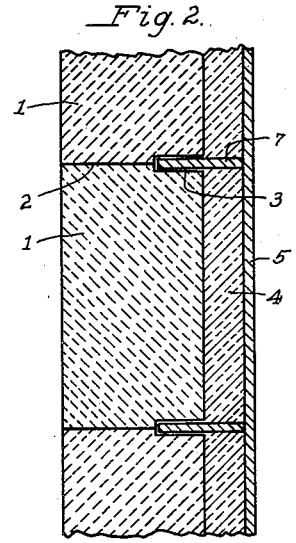
Figure 2 is a fragmentary horizontal sectional view of a glass tank wall using recessed blocks and having a heat conductive metal bar inserted in and protruding outwardly from the joint to conduct heat away from the joint.
Figure 3:
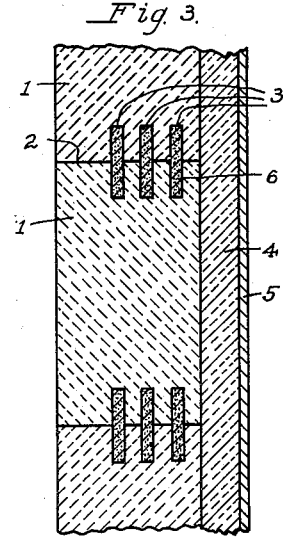
Figure 3 is a fragmentary horizontal sectional view of a glass tank wall using packing material in the joints and shows a further modified form of undercut joint.
Figure 4:
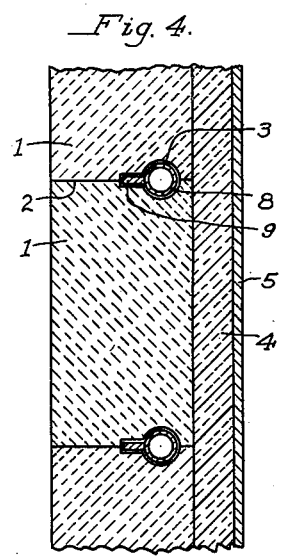
Figure 4 is a fragmentary horizontal sectional view of a glass tank wall having joints recessed to hold a hollow flanged pipe for circulating water to seal the joints.
Figure 5:
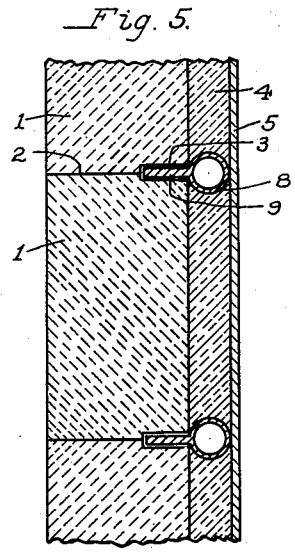
Figure 5 is a fragmentary horizontal sectional view of a glass tank wall similar to Figure 4 but having the pipe with the exception of the flange positioned outside of the joint between the wall blocks.

In the various figures, the joints 2 between blocks 1 are recessed near the outer portions as shown by numerals 3. These recesses 3 may be of any desired shape and may be filled with reactive packing material 6 as shown in Figures 1 and 3 where the recess acts as a reservoir for this joint material; or as shown in Figures 2, 4 and 5 the recess 3 may be shaped to receive heat conductive cooling members. In Figure 2 the cooling strip 7 is in the form of a metal bar which fits in the recessed portion 3 and extends out through the insulation 4 to a metal shell 5. Under certain conditions this heat conducting member may well be of a refractory such as silicon carbide rather than of metal. It is also within the scope of my invention to have such bars extend out into the open air beyond the insulation in order to be more effectively cooled by convection.

In Figures 4 and 5 the cooling member is a pipe 8 equipped with a flange 9 extending inwardly along the joint 2 and filled with circulating water. In Figure 5 the pipe 8 is not positioned in the joint but is located in the layer of insulation 4 just at the back of the joint 2.

Figure 6:
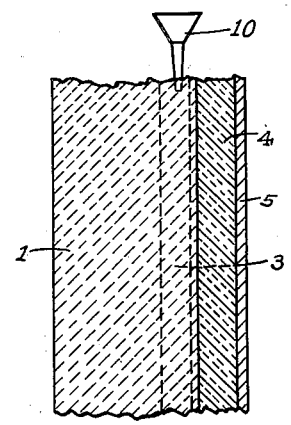
Figure 6 is a vertical cross-sectional view across the line VI—VI of Figure 1 and showing provision for the addition of material by means of gravity feed from a funnel (funnel not shown in Figure 1).

In Figure 6, numeral 10 represents a funnel or other feed hopper from which additional material is allowed to sift down into the joint space 3 as needed. Other numerals have the same significance as in Figure 1.

While the drawings have depicted various modifications, my invention is not limited to the few detailed types given therein. The drawings show horizontal cross sections of walls having vertical joints, but it is within the scope of the present invention to employ packing material and/or metallic members in the construction of the horizontal joints between tank blocks. It should, moreover, be understood that any of these means may be used in combination; for example, a joint may contain a reactive packing material and also a metallic cooling member. In the various figures, insulation has been shown on the outer face of the tank lining blocks. This is advantageous in conserving heat but my invention may be used effectively even where no insulation is used.

Although this invention has been developed primarily for use with cast refractory blocks because of their high thermal conductively, it may also be used to advantage in connection with bonded refractories.

Having clearly described and explained the present invention by means of the above detailed examples, what I claim is:

1. A glass tank wall comprising refractory blocks having a joint between adjoining blocks, an indentation in the face of one of said blocks adjoining said joint, said indentation forming a substantially enclosed space within the outer portion of said joint, and reactive packing material in said enclosed space for reacting with and rendering glass which has penetrated said joint so viscous as to substantially prevent its further movement through said joint.

2. A glass tank wall comprising heat conductive cast refractory blocks having a joint between adjoining blocks, said joint having its outer portion filled with a material potentially-reactive with glass so as to render glass which penetrates said joint so viscous as to substantially prevent its further movement through said joint.

3. The method of preventing seepage of molten glass through the joints between adjoining blocks of a glass tank lining which comprises filling the outer portion of said joints with a material potentially reactive with the glass so as to raise the viscosity of the glass and substantially prevent its further movement through said joints.

4. A glass tank wall comprising refractory blocks backed by a layer of insulation and having joints between adjoining blocks, said joints having their outer portions filled with a material potentially more reactive with glass than is the material of the block and of such nature as to render glass which penetrates said joints into contact with said material so viscous as substantially to prevent its further movement through said joints.

5. A glass tank wall comprising heat conductive cast refractory blocks backed by a layer of insulation and having joints between adjoining blocks, a material potentially reactive with glass in the outer portions of said joints for rendering glass which has penetrated said joints so viscous as to substantially prevent its further movement through said joints.

6. In a glass tank wall comprising refractory blocks and a joint between adjoining blocks, a channel within the outer portion of said joint, a reactive material in said channel and means for feeding additional reactive material to said channel.

7. In a glass tank wall comprising refractory blocks and a joint between adjoining blocks, a channel of increased sectional area within the outer portion of said joint, substantially filled with comminuted acidic refractory material.

GEORGE J. EASTER.